Fig. 1.

July 31, 1945.    P. S. ALLEN    2,380,378
AUTOMATIC PHOTOGRAPHIC APPARATUS
Filed Oct. 22, 1941    5 Sheets-Sheet 5

Fig. 15.

PHILIP S. ALLEN,
INVENTOR

BY Edwin D. Jones
ATTORNEY.

Patented July 31, 1945

2,380,378

UNITED STATES PATENT OFFICE 2,380,378

AUTOMATIC PHOTOGRAPHIC APPARATUS

Philip S. Allen, Long Beach, Calif.

Application October 22, 1941, Serial No. 415,990

12 Claims. (Cl. 95—14)

My invention relates to automatic photographic apparatus by which photographs may be taken and developed, and finished positives delivered within a short time after taking. More particularly my invention relates to that class of photographic apparatus which is automatically operable preferably upon the deposit of a suitable coin, to take a plurality of pictures of a person or other subject upon a unitary strip, and in such manner as to produce a dwell between individual exposures sufficient to enable the person to change his pose.

A purpose of my invention is the provision of such a photographic apparatus which is characterized by its structural simplicity, and the infallibility of operation of its various mechanisms at the allotted times and in the prescribed sequence, all to the end of producing of a person a plurality of successively different photographs on a unitary strip.

It is also a purpose of my invention to provide in such a photographic apparatus, a strip carrier which is vertically reciprocable to submerge the severed and exposed length of a sensitized strip, successively into a plurality of vessels containing the solutions necessary to effect complete development of the exposed strip, whereupon the developed strip is automatically ejected from the carrier for delivery to the purchaser.

I will describe only one form of automatic photographic apparatus embodying my invention, and will then point out the novel features thereof in claims.

In the accompanying drawings.

Similar reference characters refer to similar parts in each of the several views.

Figure 1:
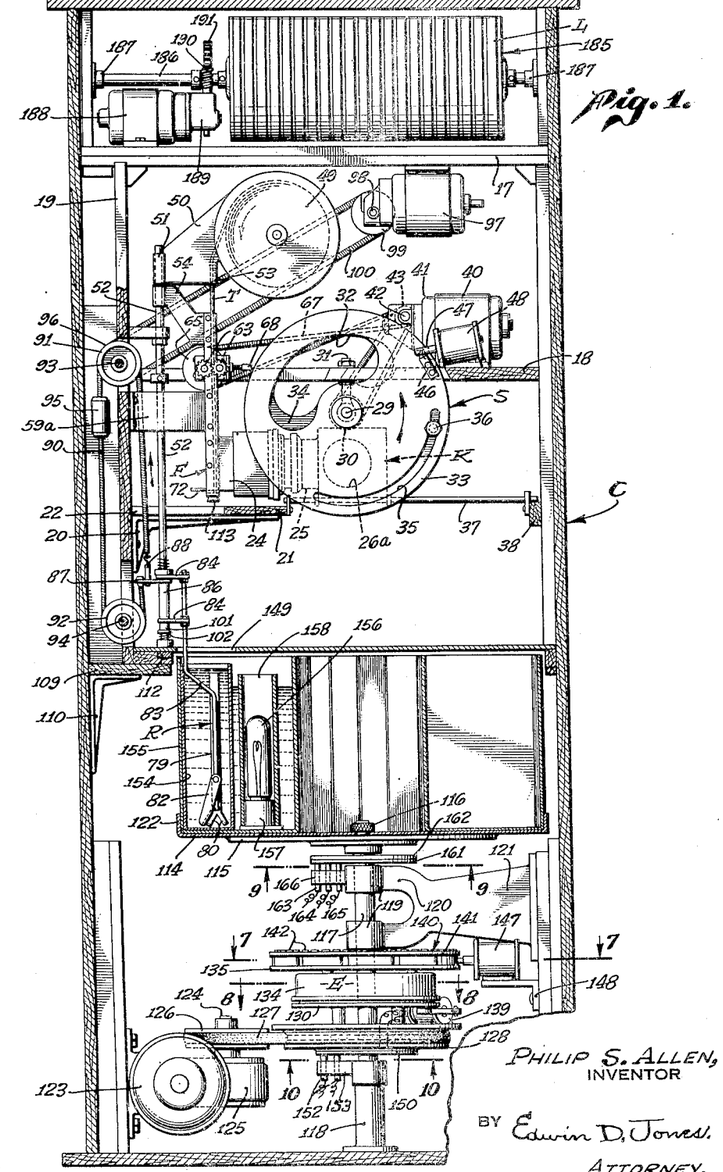
Fig. 1 is a view showing my apparatus in front elevation and partly in section, with the cabinet containing the apparatus in vertical section.
Figures 2, 3, 4:
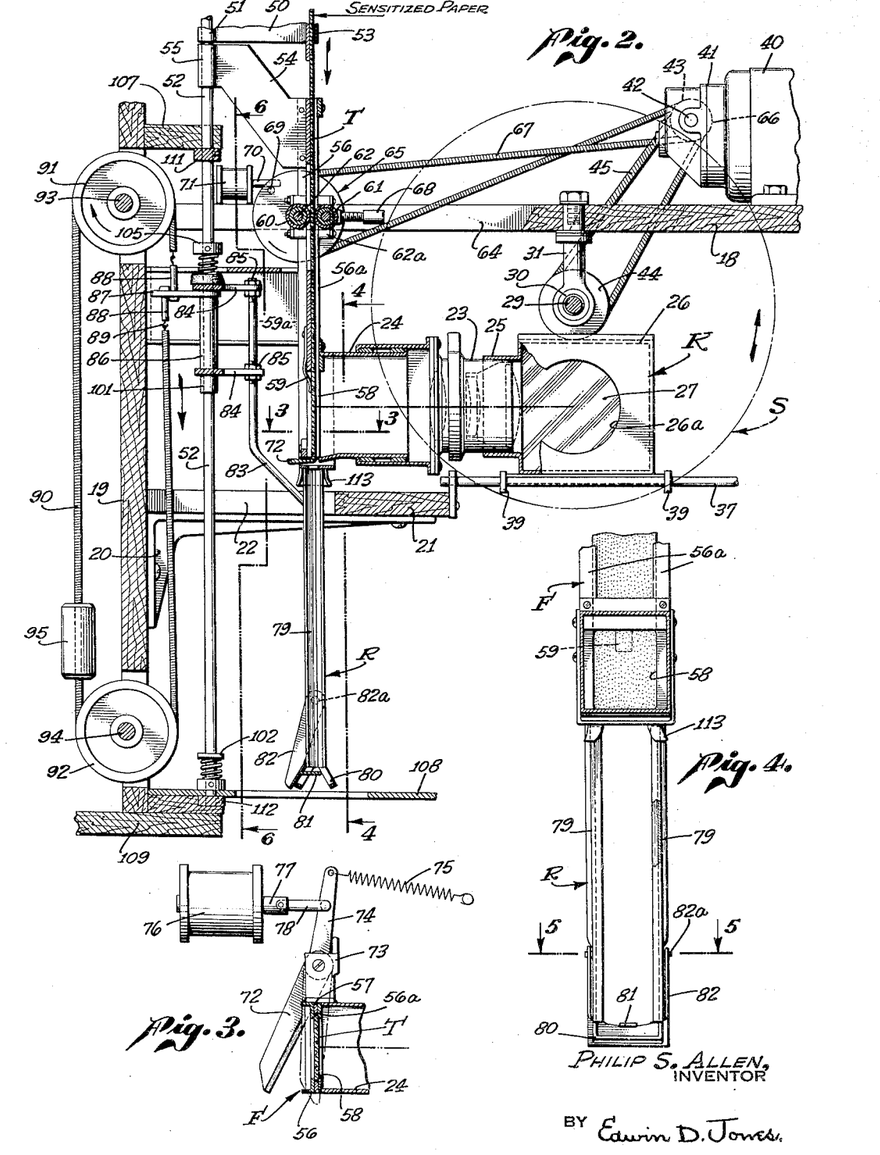
Fig. 2 is an enlarged fragmentary view of the apparatus shown in Fig. 1 with portions thereof in vertical section.
Fig. 3 is a fragmentary sectional view taken on the line 3—3 of Fig. 2.
Fig. 4 is a vertical sectional view taken on the line 4—4 of Fig. 2.
Figure 15:
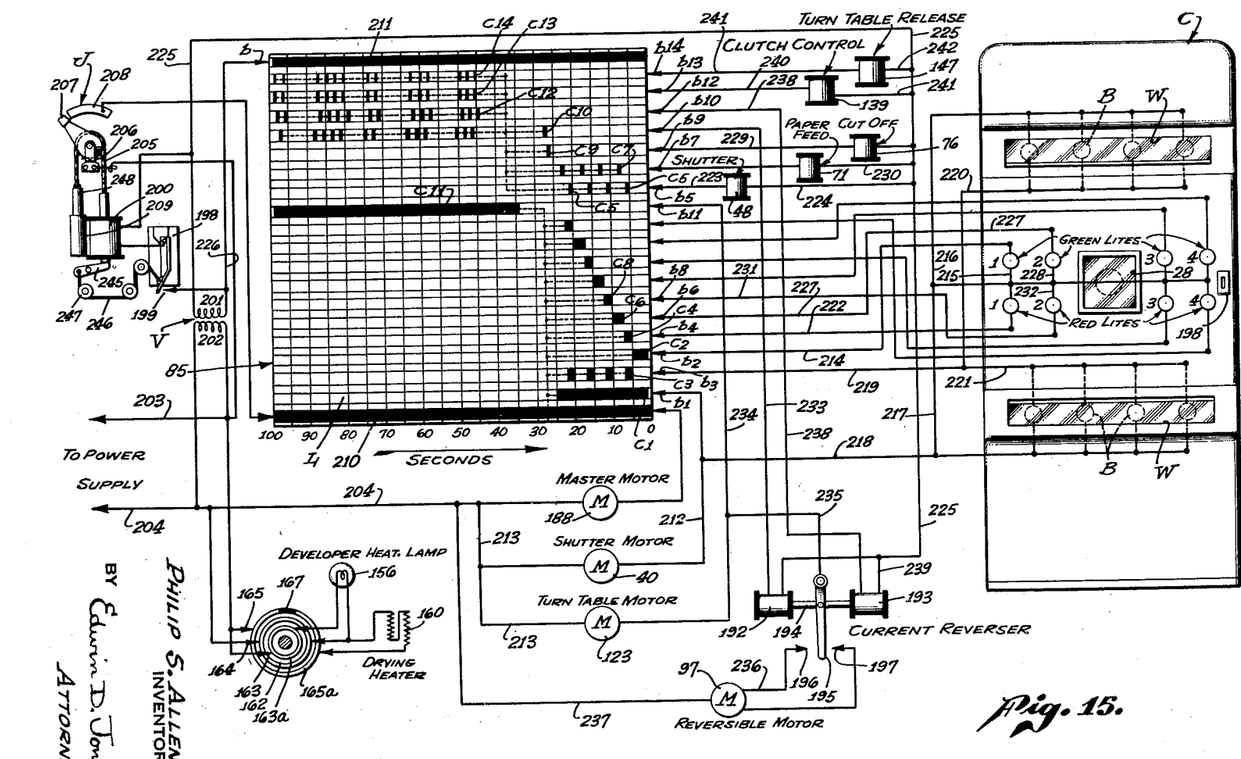
Fig. 15 is a view showing diagrammatically the electrical devices and supports therefor embodied in my apparatus, and including the cabinet of Fig. 1 in front elevation.

My apparatus in its present embodiment comprises a cabinet C of rectangular form as shown in Fig. 15 and which may be formed of wood as shown in Fig. 1. Suitably supported in the cabinet are platforms 17 and 18, and a vertical partition 19. Secured to the partition 19 is a bracket 20 upon which is supported a platform 21 provided with an opening 22. As best shown in Figs. 1 and 2, there is supported in the cabinet C a camera designated generally at K and comprising a lens tube 23 telescopically associated at one end with a tube 24 and at the other end with a collar 25 formed on a hood 26 containing a mirror 27 and having an opening 26a which coincides with a window 28 (Fig. 15) in the front wall of the cabinet C for admitting the light rays entering the cabinet through such window.

For controlling the passage of light through the window 28 onto the mirror 27 and through the lens tube 23, a rotating shutter S is provided. This shutter S is fixed to a shaft 29 mounted in a bearing 30 of a bolt 31 secured in the platform 18. For controlling the time of exposure, that is the duration of light rays passing into the hood 26, the shutter S is provided with an exposure opening 32 which is rendered adjustable by constructing the shutter of two disks 33 and 34. One of these disks 34 is fixed to the shaft 29 while the other disk 33 is loose on the shaft 29 and adjustable circumferentially and relative to the disk 34 by the provision of a slot 35 in the disk 33 and a bolt 36 threaded in the disk 34 and extending through the slot so as to secure the disk 33 in any circumferential position of adjustment as afforded by the slot. The disks 33 and 34 are each provided with an opening so that by circumferential adjustment of the disk 33 the overall length of the exposure opening 32 can be varied.

The hood 26 and the lens tube 23 are adjustable horizontally to focus the lens tube in respect to the objective, and such adjustment is effected through the provision of a pair of rods 37 fixed on the platform 21 and a suitable ledge 38, and brackets 39 slidable on the rods and secured to the hood.

The shutter S is rotated by an electrical motor 40 supported on the platform 18 and provided with a reduction gear 41 for actuating a shaft 42 to which is fixed a grooved pulley 43. This pulley 43 is operatively connected to a grooved pulley 44 fixed to the shaft 29, through the medium of a coil spring belt 45. In practice, the shutter is adapted to be intermittently rotated and each rotation is limited to a single turn by means of a lug 46 (Fig. 1) secured to the disk 34 for engagement by the normally projected spring-pressed core 47 of a solenoid 48 fixed to and supported on the platform 18.

In my apparatus I preferably employ a sensitized photographic strip T of paper upon which the objective is impressed, the negatives being developed by the application of suitable solutions and then the negatives changed to positives by other solutions, so that no printing is required as with films or plates. A supply of this sensitized photographic paper T is coiled on a reel 49 which is mounted for rotation on an arm 50 having a pair of sleeves 51 through which extend the upper ends of a pair of rods 52. The arm 50 is provided with a guide 53 for the strip T, as it extends tangentially from the reel 49 the strip passing downwardly from this guide (Fig. 2) through a strip holding and guiding device. This device comprises a pair of brackets 54 provided with sleeves 55 mounted on the rods 52, and a guiding frame F composed of a flanged plate 56 and a pair of strips 56a, between which are spacing strips 57 (Fig. 3) so as to maintain the latter spaced apart sufficient to permit the free passage of the strip T therebetween. As shown in Fig. 2, the member 56 extends across the tube 24 and at this point it is formed with an opening 58 in which the photographic strip T is adapted through the tube 24 to be exposed to the lens tube 23. The tube 24 is fixed to the adjacent strips 56a so as to register with the openings 58. For the purpose of holding the strip T against feeding upwardly in the guide frame, and flat within the openings 58, a spring clip 59 is secured to the plate 56 so that its free end extends into the opening 58 for engagement with the strip. An additional means for supporting the frame F rigidly in vertical position are a pair of brackets 59a secured to the frame and to the partition 19 (Fig. 2).

The sensitized strip is adapted to be fed downwardly through the guiding frame F by means of a pair of feed rollers 60 and 61, one of which is adapted to be driven by a shaft 62 to which it is fixed. This driving movement is transmitted to the other feed roller through intermeshing pinions 63. The rollers 60 and 61 and the shaft 62 are mounted in suitable bearings 62a supported in a suitable opening 64 in the platform 18.

The shaft 62 is provided with a grooved pulley 65 which is operatively connected to a grooved pulley 66 fixed on the shaft 42, by a coil spring belt 67. The required pressure of the rollers 60 and 61 against the strip T to effect proper feeding of the strip is attained through an adjustment of the roller 61 by means of a screw 68.

As with the shutter S, the feed rollers 60 and 61 are adapted to be rotated in a step-by-step movement, and such rotation is limited in each case to one revolution of the pulley 65 by the provision of a lug 69 on the pulley which is engaged by the spring-projected core 70 of a solenoid 71 when the latter is energized.

In accordance with the operation of my apparatus, the strip T is adapted to be successively fed downwardly in a step-by-step movement until a predetermined number of frames of the strip T have been exposed following which, the strip is severed just above the final exposed frame. To effect such severing a cutting blade 72 is pivotally mounted on a bracket 73 secured to the guide frame F (Fig. 3) and the mounting of this blade is such that it can move into the guide frame at a point opposite the inner lower edge of the tube 24 in effecting severing of the strip T. The blade 72 is provided with an extension 74 to which is connected a spring 75 for normally urging the blade to the position shown in solid lines in Fig. 3. The blade is actuated to effect a severing of the strip T through energization of a solenoid 76 the core 77 of which is operatively connected to the extension 74 through the medium of a link 78. The solenoid 76 is supported on and suitably secured to the platform 21.

As the photographic strip is fed downwardly through the guide frame F it passes into a strip carrier designated generally at R comprising two bars 79 V-shape in cross-section (Fig. 5) and secured one to the other at the bottom by a pair of divergent U-shaped legs 80. By virtue of the V-form of the bars 79 the strip is slidably received at its edges in the carrier, but it is retained against falling from the carrier by the provision of a stop finger 81 normally spanning the bottom of the carrier and fixed to an inverted U-shaped yoke 82 which is pivoted as at 82a on the carrier so that the stop finger 81 prevents the strip falling from the carrier.

The carrier R is adapted to be automatically and intermittently reciprocated from the position shown in Fig. 2 to that shown in Fig. 1, for the purpose of successively submerging the severed length of strip T into the various solutions necessary to its development, and for subsequent wiping and drying and finally for discharge into a delivery chute. To effect such a reciprocal movement of the carrier R the following mechanism is provided, reference being had to Figs. 1, 2 and 6. A pair of rods 83 are fixed at their lower ends to the outer edges of the bars 79 and at points adjacent the lower ends of the latter. These rods 83 extend upwardly from the carrier and through a pair of cross brackets 84 in which the rods are secured by means of nuts 85. The brackets in turn, are slidably mounted on the rods 52 and held in fixed spaced relationship thereon by means of spacing sleeves 86.

Secured to the upper one of the brackets 84 is an arm 87 having bolts 88 provided with hooks 89 to which the opposite ends of a coil spring belt 90 are secured. The belt 90 is trained around grooved pulleys 91 and 92 on shafts 93 and 94 suitably mounted in the partition 19, and the belt carries a weight 95 for counterbalancing the strip carrier R. The shaft 93 for the upper pulley 91 has also fixed thereto a grooved pulley 96 which is driven by a reversible motor 97 secured to the under side of the platform 17 and operatively connected to the pulley 96 through a shaft 98 carrying a pulley 99 which is connected to the pulley 96 through a coil spring belt 100.

Manifestly, through operation of the motor 97 the belt 90 can be actuated to lower the strip carrier R from the position shown in Fig. 2 to that shown in Fig. 1, or from the latter position to the former position, depending upon the direction of rotation of the motor. In the descending movement of the carrier the sleeves 86 slide downwardly on the rods 52, the lower bracket 84 having tubular extensions 101 which abut a spring cushioned plate 102 on the rods 52 to absorb the resulting shock. In the upward movement of the carrier rubber rings 103 fixed to the upper bracket 84 engage springs 104 confined in fixed position on the rods by pinned collars 105. Similar collars 106 are on the lower ends of the rods 52. Adjacent their upper ends the rods 52 extend through a support 107 secured to the partition 19, while their lower ends extend through a cover plate 108 partly supported by a platform 109 secured on a bracket 110. Short bars 111 and 112 are pinned to and bridge the rods 52 to secure them in fixed position vertically. The upper bar 111 is just beneath the support 107, while the lower bar 112 is just beneath the cover plate 108.

A pair of guide lips 113 (Figs. 2 and 4) are secured to and depend from the lower end of the guide frame F for the purpose of vertically aligning the upper end of the carrier R with the lower end of the guide frame.

Figures 11, 12, 13, 14:
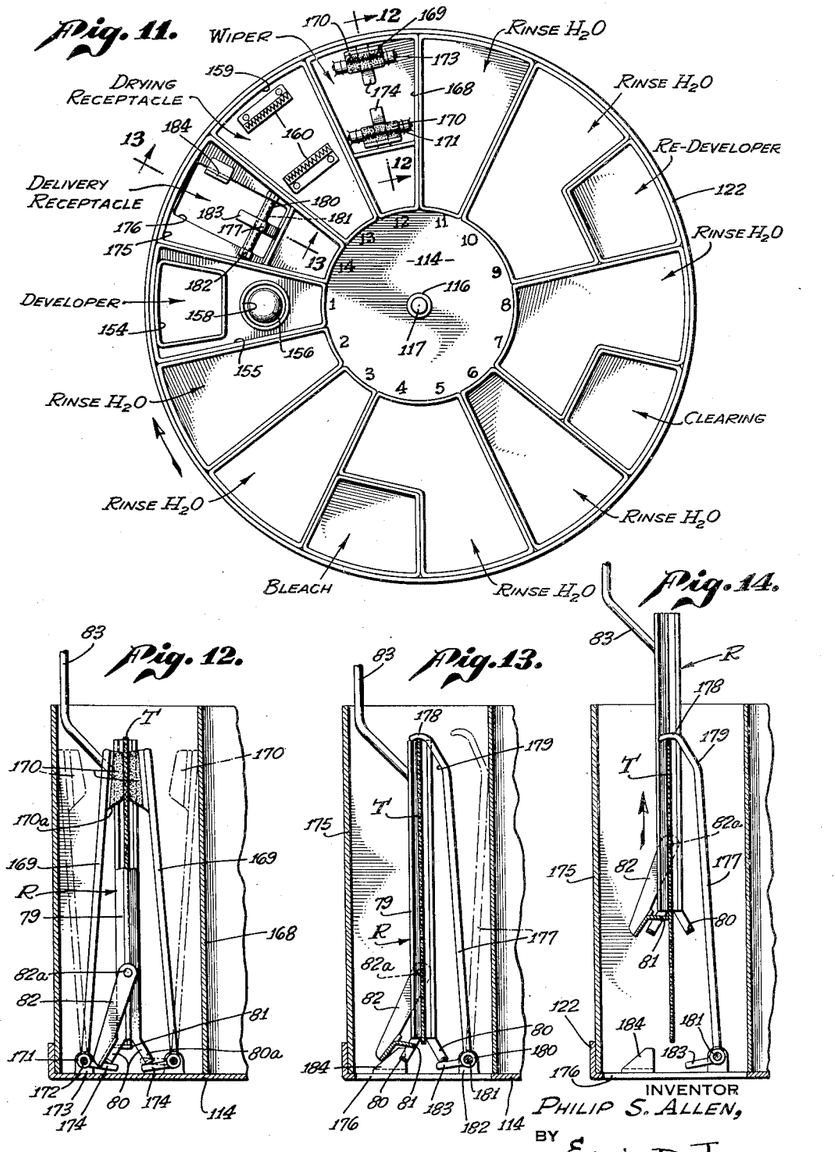
Fig. 11 is a view showing in plan the turntable, vessels and receptacles of the apparatus shown in Fig. 1, with legends identifying the solutions and devices contained in the vessels and receptacles.
Fig. 12 is an enlarged vertical sectional view taken on the line 12—12 of Fig. 11 and showing the strip carrier therein.
Fig. 13 is an enlarged vertical sectional view taken on the line 13—13 of Fig. 11 and showing the strip carrier therein.
Fig. 14 is a view similar to Fig. 13 with a strip carrier in the process of being withdrawn from the receptacle.

For developing, redeveloping, wiping and drying each length of exposed strip T following its passage into the carrier R, a circular series of vessels and receptacles are provided, all of which are supported on a turn-table 114 which is intermittently rotatable in a step-by-step movement to successively position them beneath the strip carrier for the reception of the latter. As shown in Fig. 1, the turn-table 114 is fixed to a disk 115 by a screw 116, with the latter in turn secured to the upper end of a shaft 117. The lower end of this shaft 117 is rotatable in an upstanding sleeve 118 secured at its lower end to the floor of the cabinet. A pair of spaced bearings 119 on the forked end 120 of a bracket 121 secured to the inner side of the cabinet completes the mounting for the shaft 117. The table 114 is provided with a peripheral upstanding flange 122 which serves to confine the several vessels and receptacles on the table against displacement under rotational movement of the latter. As shown in Fig. 11, the vessels and receptacles are of segmental form so that they interfit to define a circular opening at its center for access to the screw 116 and to facilitate application and removal of the vessels and receptacles to and from the table. Suitable solutions adapted to be contained in the various vessels are identified in Fig. 11 by the legends. Suffice it to say, that the solutions employed are conventional for the development and redevelopment of the photographic strip to produce the ultimate positive.

As previously stated herein, the turn-table 114 is rotatable in a step-by-step movement, to present the vessels and receptacles successively to the strip carrier R, and in that order indicated by the numerals appearing on the table at the open center thereof in Fig. 11. To produce such movement of the turn-table, I provide a motor 123 suitably secured in the cabinet C and operatively connected to a vertical shaft 124 through a reduction gear 125. This shaft 124 has a pulley 126 fixed thereto and about which is trained a belt 127, the belt also being trained about a larger pulley 128 mounted for free rotation on the shaft.

Figures 5, 6, 7, 8, 9, 10:
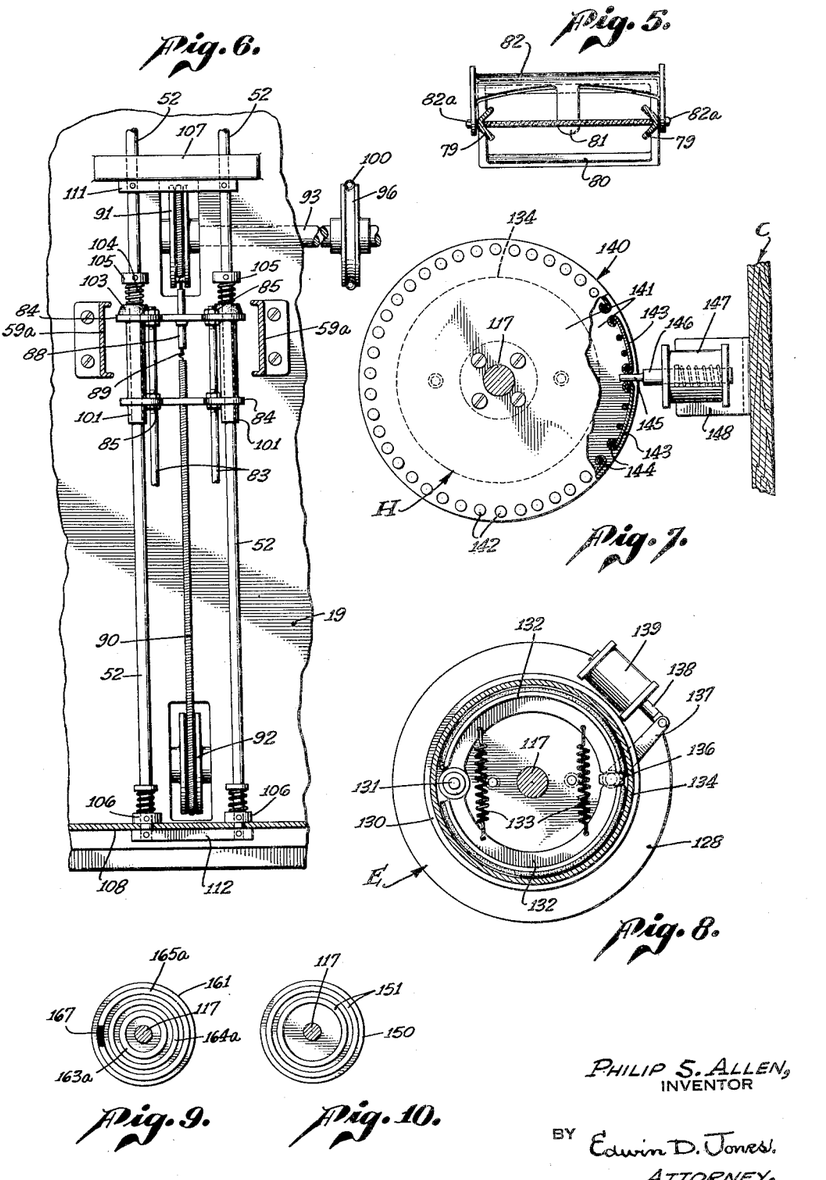
Fig. 5 is an enlarged horizontal sectional view taken on the line 5—5 of Fig. 4.
Fig. 6 is a vertical sectional view taken on the line 6—6 of Fig. 2.
Fig. 7 is an enlarged horizontal view taken on the line 7—7 of Fig. 1, with a portion of the upper disk broken away.
Fig. 8 is an enlarged horizontal sectional view taken on the line 8—8 of Fig. 1.
Fig. 9 is a horizontal sectional view taken on the line 9—9 of Fig. 1.
Fig. 10 is a horizontal sectional view taken on the line 10—10 of Fig. 1.

A clutch E is normally inactive to connect the pulley 128 to the shaft 117, but is rendered active through the provision and energization of a solenoid. As best shown in Fig. 8, the clutch E comprises a disk 130 fixed to and supported on the pulley 128, and having pivoted thereon, as at 131, a pair of brake shoes 132 normally contracted by a pair of springs 133. Fixed to the shaft 117 and surrounding the shoes 132 is a drum 134 which transmits motion to the shaft from the pulley 128 when the shoes are moved to expanded position against the inner side of the drum. For this purpose a cam 136 is rotatably mounted on the disk 130 and provided with an arm 137 operatively connected to the core 138 of a solenoid 139, the latter being fixed to the upper side of the pulley 128. Manifestly, when the solenoid 139 is energized the cam 136 is actuated to expand the shoes 132 into engagement with the drum against the tension of the springs 133, and to thereby operatively connect the disk 130 to the drum to transmit rotational movement of the pulley 128 to the drum.

For limiting rotational movement of the drum to in turn define the steps of rotation of the turntable 114 in the manner previously described, a control device H is provided. This control device comprises a wheel 140 fixed to the drum 134 and made up of a pair of spaced disks 141 into which an annular series of headed pins 142 are removably fitted in suitable openings. As best shown in Fig. 7, these pins 142 carry arcuate strips 143 of metal having terminal sleeves 144 through which certain of the pins 142 are extended for securing the strips between the disks with their confronting ends spaced to provide intervening gaps. The control device also embodies a stop pin 145 on the end of a spring projected core 146 of a solenoid 147 to extend into any one gap and thereby engage between the confronting ends of any two adjacent strips and prevent rotation of the wheel. The solenoid 147 is fixed on a bracket 148 secured to the cabinet. When the stop pin is retracted by energization of the solenoid the wheel is released to permit of its being rotated by the clutch E. However, in the operation of the apparatus the solenoid 147 is only momentarily energized so that following retraction of the stop pin from any one gap to release the wheel, the pin is again projected to bear against the outer side of any one strip, and thus pass into the next gap in advance to check further rotation of the wheel.

Manifestly, the strips 143 are of various lengths to position the gaps at points about the wheel corresponding to the circumferential positions of the vessels and receptacles. Thus, irrespective of the tendency of the clutch E when active, to drive the turntable a distance exceeding that between centers of any two adjacent vessels or receptacles, the control device H is operative to restrict rotation of the turn-table to a step-by-step movement so as to successively present to the carrier R and beneath an opening 149 (Fig. 1) in the cover plate 108 for all of the vessels and receptacles, such vessels and receptacles in the order and for the duration of each as prescribed for complete treatment of each exposed photographic strip.

For supplying current to the clutch actuating solenoid 139 as it rotates with the pulley 128, a current distributor is provided comprising a disk 150 of insulating material fixed to the underside of the pulley 128, and carrying two conducting rings 151 (Fig. 10). Two contact brushes 152 bear against the rings 151 and are supported in a bracket 153 secured to the upper end of the sleeve bearing 118. The rings are electrically connected to the solenoid 129 by passing conductors upwardly through the pulley, as indicated in Fig. 1.

As shown in Figs. 1 and 11, the initial developing solution for the photographic strip T is contained in a vessel 154, and this vessel is received in a larger vessel 155 containing water. The water is constantly heated to in turn maintain the developing solution heated, by an electric lamp 156 fitted in a socket 157 in the bottom of a tubular receptacle 158 within the vessel 155. Again in Fig. 11, the receptacle 159 contains a pair of electrical heating elements 160 spaced apart to receive the carrier R therebetween and to thus dry the developed strip contained in the carrier.

The lamp 156 and the elements 160 are adapted to be supplied with current through a distributor (Figs. 1, 9 and 15) which comprises a disk 161 of insulating material secured to the underside of a metal disk 162, and the latter in turn is fixed to the shaft 117 for rotation therewith. Three brushes 163, 164 and 165 are supported in an extension 166 of the forked end 119 of the bracket 120, to contact with three conducting rings 163ª, 164ª, and 165ª on the underside of the disk 161. Suitable conducting wires may extend to and from the rings to the lamp 156 and heating elements 160. The ring 165ª as shown is split and spanned by a section 167 of insulating material for the purpose of discontinuing current flow to the heating elements when the apparatus is at rest.

As shown in Figs. 11 and 12 a delivery receptacle 168 contains a wiping device for the developed photographic strip, and this device may comprise a pair of arms 169 provided at their upper ends with confronting wiping pads 170, and at their lower ends with sleeves 171 through which pins 172 extend and are rotatable in ears 173 secured to the bottom wall of the receptacle. Fingers 174 are fixed to and project from the sleeves 171 at the confronting sides of the arms 169. The arms 169 normally occupy the open position shown in broken lines in Fig. 12, so that the strip carrier R can be lowered into the receptacle between the arms.

As the carrier reaches its lowermost position within the receptacle, the legs 80 engage the fingers 174 and swing the arms 169 to closed position wherein the pads 170 contact opposite sides of the photographic strip T contained in the carrier. Upon elevation of the carrier from the receptacle the pads are caused to wipe the sides of the strip free of water, the pads being moved outwardly from the carrier only after the legs have engaged the lower ends of the pads, whereby through cooperation of the cam surfaces 80ª and 170ª, of the legs and pads, the arms are swung to open position. This allows the legs to pass outwardly between the arms, leaving the arms in open position for a succeeding wiping operation.

In another receptacle 175 is contained a device (Figs. 13 and 14) for ejecting the photographic strip from the carrier through a bottom opening 176 and into a suitable delivery chute (not shown). This ejecting device may comprise an arm 177 having an upper end provided with a hook 178 and a cam 179 having a lower end provided with a sleeve 180 through which a pin 181 extends and is rotatable in ears 182 secured to the bottom wall of the receptacle at opposite sides of the opening 176. A finger 183 extends from the sleeve 180 so as to be disposed centrally at one end of the opening 176. A cam 184 is secured on the receptacle bottom so as to project somewhat into the discharge opening 176.

Referring to Fig. 13, the arm 177 normally occupies the broken line position shown so the way is free for descent of the strip carrier R into the delivery receptacle 175. In the lowermost position of the carrier one of the legs 80 has engaged the finger 183 to swing the arm 177 to the solid line position, in which the hook 178 extends over the upper end of the photographic strip T, contained in the carrier. Meanwhile, the horizontal portion of the yoke 82 has engaged the cam 184, and moved the yoke to the position shown to displace the finger to one side of the lower end of the strip.

With the various elements in the positions just described, the photographic strip T is ejected from the carrier R upon ascension of the latter from the receptacle 175, as illustrated in Fig. 14. As the carrier proceeds upwardly the strip is held against ascending by the hook 178, so that once the carrier is out of the receptacle, the strip is completely removed from the carrier, and thus the strip is free to drop through the delivery opening 176 into the chute. During this strip ejecting operation, the yoke 82 is lifted free of the cam 184, thereby tending to swing back to its normal position but restrained therefrom by the stop finger 81 engaging the side of the strip until the carrier clears the strip, when the finger returns to strip supporting position for a succeeding strip.

In Fig. 1 is shown a master current distributor L comprising a drum 185 of insulating material having various electrical contacts on its periphery as shown schematically in Fig. 15. The drum 185 is fixed to a shaft 186 journaled in bearings 187, and the shaft is driven from an electric motor 188 through a reduction gearing 189 having a worm shaft 190 meshing with a gear 191 fixed to the shaft 186. The motor 188 is supported on and fixed to the platform 17.

In Fig. 15, the cabinet C is shown provided with two banks of electric lamps B behind two windows W situated above and below the exposure window 28. These lamps are for the purpose of illuminating the person being photographed as he sits in front of the cabinet with his face opposite the window 28.

Also, in Fig. 15, the cabinet C is provided at its front with four pairs of signaling lamps, 1, 2, 3, and 4, one pair for each exposure or picture. As designated by the legends, the upper lamps are green for signaling to the subject that he should prepare to pose, while the lower lamps are red to signal the beginning and ending of each exposure.

Again in Fig. 15, a current reverser for the motor is provided, comprising a pair of solenoids 192 and 193 having a common core 194 for actuating a contact arm 195 pivoted to engage either of a pair of contacts 196 or 197 according as one solenoid or the other is energized, to supply current to the motor 97, in one direction or the other.

As previously stated herein my apparatus is designed to be set into operation upon the deposit of a suitable coin therein. To this end any suitable coin-controlled switch mechanism may be employed such as for example, the switch mechanism disclosed in Fig. 3 of United States Letters Patent No. 1,671,644, dated May 29, 1928. In Fig. 15, I have shown diagrammatically such mechanism, and the elements comprised therein and their mode of operation shall be briefly described in describing the operation of the entire apparatus which is as follows:

The apparatus is set into operation by the deposit of a coin into a chute 198 in the front of the cabinet C, as shown in Fig. 15, and as also shown in the coin-controlled switch mechanism at the left in the same figure. The coin operates to close the switch 199 and supply current to a solenoid 200 from the secondary 201 of a step-down transformer V, the primary 202, of such transformer being connected across the wires 203 and 204 of a power supply circuit.

Solenoid 200 being energized, its core is moved to close a master switch J through a chain 205 and a sprocket 206 rotating the switch arm 207 to move it slowly over a contact strip 208 under the restrained action of a dash-pot 209, to the plunger of which the chain is connected. The time required for the arm 207 to traverse the strip 208 is about 100 seconds, which is sufficient to allow one complete operation of the apparatus to take, develop and deliver four photographic positives.

It is by closure of the master switch J that current is supplied to the master motor 188 for rotation of the master distributor L in the direction of the arrow in Fig. 15, and through a circuit which includes the wires 203 and 204 and a master contact 210 of the distributor L.

In the diagrammatic showing of the distributor in Fig. 15, it is flattened to reveal all of the various electrical contacts by which current is supplied to the various electrical devices and lamps of the apparatus. Suffice it to say for the present, there are two groups of distributor contacts, one group for the solenoids, and the other group for the lamps and motors. The latter group includes the annular master contact 210 to which all of the other contacts of that group are electrically connected by the wires indicated in broken lines in Fig. 15. Similarly, the other group of contacts includes a master contact 211, in the form of a split ring, which is electrically connected to all of the other contacts of that group by the wires shown in broken lines. The several arrows appearing in contact with the distributor drum 185, represent brushes for engagement with the drum contacts.

The master switch J having been closed and the distributor drum 185 set into rotation, the apparatus proceeds to operate as follows:

Master contact 211 engages brush $b$, and contact $c^1$ engages brush $b^1$ to close the circuit for the shutter motor 40 which is from wire 203, master contact 210, contact $c^1$, brush $b^1$, wire 212, motor 40, and wire 213 to return wire 204. Although motor 40 is now energized, it is ineffective to actuate the shutter S because of the core 47 engaging the lug 46, the belt 45 slipping on the pulley 44, and allowing the motor to continue to operate. Substantially simultaneously with initial operation of the shutter motor 40, contact $c^2$ engages brush $b^2$ to close the circuit for the green lamp 1 and thereby illuminate the latter to signal to the subject that he should pose for the taking of his picture. The circuit for the green lamp 1 is as follows: From wire 203, master contact 210, contact $c^2$, brush $b^2$, wire 214, green lamp 1, wires 215, 216, 217, 218 to wire 212.

Illumination of green lamp 1 is only momentary and with extinguishment thereof the banks of lamps B, B are energized to illuminate the subject. The circuit for these lamps is from wire 203, contact 210, the first of four contacts $c^3$, brush $b^3$, wires 219, 220, and 221 through lamps B, B to wires 217 and 218. Concurrently with illumination of the subject, red lamp 1 is illuminated to signal to the subject that the exposure is now being made. The circuit for the red lamp is from wire 203, contact 210, contact $c^4$, brush $b^4$, wire 222, red lamp 1 to wire 216. Simultaneously with illumination of the red lamp 1, the shutter solenoid 48 is energized through the following circuit: From master contact 211 to the first of the series of contacts $c^5$, brush $b^5$, wire 223, solenoid 48, wire 224 and wire 225, secondary 201 of the transformer V, wire 226 to brush $b$. With energization of solenoid 48, its core 47 is retracted to disengage the lug 46 and thereby permit rotation of the shutter S by the motor 40. Energization of the solenoid 48 is only momentary, so that before the shutter S has completed one revolution the solenoid is deenergized permitting the core 47 to project and be engaged by the lug 46, upon one revolution of the shutter. During this operation of the shutter the first or lowermost frame of the photographic strip T is exposed in the tube 24, as shown in Fig. 2 and thus an image of the subject is photographically recorded on the strip frame.

Following such initial exposure, red lamp 1 and the banks of lamps B, B are extinguished as will be evidenced by the length of the distributor contacts. However, immediately following such extinguishment, the green lamp 2 is illuminated to indicate to the subject that he should make himself ready for the second exposure. The circuit for the green lamp 2 is as follows: From contact $c^6$, brush $b^6$, wire 227, green lamp 2 and wire 228 to return wire 216. Following illumination of green lamp 2, the solenoid 71 is energized to retract its core 70 free of the lug 69, thereby permitting rotation of the pulley 65 by the motor 40. As previously described, the motor 40 was energized before this step in the operation of the apparatus, but it was ineffective until now to actuate the pulley 65 because of the core 70 engaging the lug 69. As with the belt 45, the belt 66 merely slipped about the pulley 65.

With release of the pulley 65 the feed rollers 60 and 61 are actuated to feed the photographic strip downwardly within the guiding frame F, a distance corresponding to the next frame of the strip, at which time, the pulley 65 has been rotated and the solenoid 71 deenergized to permit projection of the core 70 into the path of lug 69, and thus stop rotation of the pulley and feed rollers. The solenoid 71 is only momentarily energized to limit rotation of the pulley 65 to one complete turn in the manner just described, through the following circuit: From contacts $c^7$, the first of four, brush $b^7$, wire 229, solenoid 71, wire 230 to return wire 225.

With feeding of the strip T to present to the tube 24 and hence to the camera, the second frame of the strip, the green lamp 2 is extinguished and red lamp 2 is illuminated and through the following circuit: From contact $c^8$, brush $b^8$, wire 231, red lamp 2, wire 232 to return wire 216. Simultaneously with this operation the solenoid 48 is reenergized to release the shutter S and thereby expose the second frame of the strip. Such reenergization is effected through the second of the series of contacts $c^5$ engaging the brush $b^5$. Simultaneously with operation of the shutter the banks of lamps B, B are again illuminated by brush $b^3$ engaging the second of the series of contacts $c^3$ to illuminate the subject during this second exposure.

Having described how my apparatus operates to expose two of the four frames of the photographic strip, and the control of the lamps to signal and illuminate the subject, it is believed unnecessary to describe the succeeding operations of the apparatus necessary to effect the exposure of the other two frames, and the signaling and illumination of the subject, as it will be clear that the arrangement of contacts of the master distributor is such as to effect the automatic operation of the several lamps and solenoids and to deenergize the motor 40 once the shutter S has been actuated to effect the fourth exposure. Therefore, let it now be assumed that the first four frames of the strip T have been successively exposed, and this length of strip fed into the carrier R with the latter in the elevated position shown in Fig. 2. Continued rotation of the distributor L brings contact $c^9$ into engagement with brush $b^9$ to supply current momentarily to solenoid 76, and thereby actuate blade 72 to sever the strip at a point just above the last exposed frame.

Severance of strip T is immediately followed by energization of solenoid 192 of the current reverser to move contact arm 195 into engagement with contact 196. The circuit for the solenoid 192 is from contact $c^{10}$, brush $b^{10}$, wire 233, solenoid 192, and return wire 225. Shortly following actuation of the current reverser, contact $c^{11}$ engages brush $b^{11}$ to not only supply current momentarily to motor 123 through wire 234, but to motor 97 through wire 235, contact arm 195, contact 196, wire 236, motor 97, and wire 237 to return wire 204.

Motor 97 now operates in such direction that the belt 100 rotates the shaft 93 clockwise to actuate the belt 90 and lower the carrier R to the position shown in Fig. 1. As the precise duration of rotation of motor 97 is not controlled, once motor 97 operates to lower the carrier R, belt 100 slips on pulley 96 until the motor comes to rest.

With initial operation of my apparatus, the vessel 154 is disposed directly below the carrier R, so that upon initial lowering of the carrier as just described, the exposed and severed length of strip is submerged in the developing solution contained in the vessel, as shown in Fig. 1, and which solution is heated by current supplied to the lamp 156 through brushes 163, 164. The strip remains in this solution for the required period whereupon solenoid 193 is energized to throw contact arm 195 into engagement with contact 197 to reverse the flow of current through motor 97 by establishing a circuit through the first of a series of contact $c^{12}$, brush $b^{12}$, wire 238, solenoid 193, wire 239 to wire 225. Thus motor 97 now operates to drive belt 90 in the other direction and thereby elevate carrier R to its upper position so as to withdraw the strip T from the vessel 154.

Immediately following this operation, the first of a series of distributor contacts $c^{13}$ engages brush $b^{13}$ to energize solenoid 139 through wires 240 and 241. Thus clutch E is now rendered active to operatively connect pulley 128 to shaft 117, it being recalled that motor 123 was and still is energized. Simultaneously with operation of the clutch solenoid 147 is momentarily energized to release wheel 140 and thereby permit rotation of the turn-table 114 in a clockwise direction, as when viewed in Fig. 11. The circuit for solenoid 147 may be traced from the first of a series of contacts $c^{14}$ to brush $b^{14}$, wire 241, solenoid 147, and wire 242 to return wire 225.

Because of the strips 143 and the core 145, rotation of the turn-table is limited to present the next vessel (No. 2 in Fig. 11), beneath the carrier C, when the circuit for solenoid 192 is reestablished through the next contact $c^{10}$ of the series engaging brush $b^{10}$, to reverse current flow through motor 97. In consequence, carrier R is again lowered but into vessel 2 where the strip T is partly rinsed of the developing solution.

By considering the remaining distributor contacts of the series $c^{10}$, $c^{12}$, and $c^{13}$, it should be clear that this intermittent lowering and raising of the carrier R and the intervening step-by-step rotation of the turn-table 114 continues until the strip T has been submerged successively into the various liquids to convert it into a positive, following which the carrier is lowered into receptacle 168 for wiping by the pads 170, then into receptacle 159 for drying by the heating elements 160, and then into receptacle 175 for ejection from the carrier through the opening 176 into the delivery chute. Following ejection of the strip T, the carrier returns to its uppermost position (Fig. 2) in strip receiving relation to the strip guide F, while the turn-table is rotated another step to bring vessel 154 beneath the carrier in readiness for a second operation of the apparatus.

Following this final rotation of the turn-table, the arm 207 of the switch J passes off of contact strip 208 to disrupt the main power circuit at the rear of the transformer V. At this instant the lower end of the core of the solenoid 200 engages and rocks a lever 245 to pull on a cable 246 extended around pulleys 247 and connected to that movable part of the coin chute 198 to which the switch 199 is connected, thereby actuating the coin chute part to release the coin and open the switch 199 to deenergize the solenoid. With the solenoid deenergized its core is restored to elevated position and switch arm 207 rotated back to starting position, both under the action of a weight 248.

I claim:

1. In an automatic photographic apparatus for taking a series of pictures in sequence on a flexible sensitized strip; a carrier for receiving said strip after exposure; means for retaining said strip against discharge therefrom; vessels and a delivery receptacle beneath said carier, said receptacle having an opening in its bottom; means for intermittently and successively moving said vessels and then said receptacle into vertical alinement with said carrier; mechanism for vertically and intermittently reciprocating said carrier so that said strip is lowered successively into said vessels and then into said receptacle; means in said receptacle for actuating said strip retaining means to release said strip; and means in said receptacle for ejecting said strip from said carrier through said opening following release of said strip.

2. In an automatic photographic apparatus for taking a series of pictures in sequence on a flexible sensitized strip; a carrier for receiving said strip after exposure; a support directly beneath said carier; mechanism for vertically reciprocating said carrier; means for retaining said strip in said carrier; means on said support for actuating said strip-retaining means to release said strip upon movement of the carrier downwardly towards said support; and means on said support for ejecting said strip from said carrier following release of said strip.

3. In an automatic photographic apparatus for taking a series of pictures in sequence on a flexible sensitized strip; a carrier for receiving said strip after exposure; a member on said carrier for retaining said strip within the carrier; a support directly beneath said carrier; a second member on said support for moving said strip-retaining member to release said strip upon lowering said carrier towards said support; a strip ejecting member, pivoted on said support to normally occupy one position in which it is vertically disalined, with reference to said carrier, and another position in which it engages said strip upon lowering of said carrier; and coacting means on said support and on said carrier for moving said strip-ejecting member to the second mentioned position, whereby upon elevation of said carrier from said support said strip ejecting member will eject the strip from the carrier.

4. In an automatic photographic apparatus for taking a series of pictures in sequence on a flexible sensitized strip; a carrier for receiving said strip after exposure; a member on said carrier for retaining said strip within the carrier; a support directly beneath said carrier; a second member on said support for moving said strip-retaining member to release said strip upon lowering said carrier towards said support; a strip ejecting member pivoted on said support to normally occupy one position in which it is vertically disalined with reference to said carrier, and another position in which it engages said strip upon lowering of said carrier; a leg on said carrier; and a finger connected to said strip connecting member for engagement by said leg to move said member to the second mentioned position, whereby upon elevation of said carrier from said support said member will eject said strip from the carrier.

5. In an automatic photographic apparatus for taking a series of pictures in sequence on a flexible sensitized strip; a carrier for receiving said strip after exposure; a member on said carrier for retaining said strip within the carrier; a support directly beneath said carrier; a second member on said support for moving said strip-retaining member to release said strip upon lowering said carrier toward said support; a strip ejecting member pivoted on said support to normally occupy one position in which it is vertically disalined with reference to said carrier, and another position in which it engages said strip upon lowering of said carrier; coacting means on said support and on said carrier for moving said strip-ejecting member to the second mentioned position, whereby upon elevation of said carrier from said support said strip ejecting member will eject the strip from the carrier; and coacting elements on said strip-ejecting member and on said carrier operable upon elevation of said carrier from said support to restore said strip-retaining member to strip-retaining position and said strip-ejecting member to the first mentioned position.

6. In an automatic photographic apparatus for taking a series of pictures in sequence on a flexible sensitized strip; a carrier for receiving said strip after exposure; a delivery receptacle directly beneath said carrier having a delivery opening in the bottom thereof; mechanism for lowering said carrier into said receptacle and then elevating the carrier out of the receptacle; an arm in said receptacle having a hook on its upper end; means for pivotally mounting said arm in said receptacle to occupy one position in which it is vertically disalined with respect to said carrier, and another position in which said hook engages the upper end of said strip as contained in said carrier, whereby upon elevation of said carrier said hook operates to retain said strip within said receptacle and to thereby withdraw the said strip from said carrier; and coacting means on said carrier and said arm for moving the latter to cause said hook to engage said strip after said carrier has been lowered into said receptacle.

7. In an automatic photographic apparatus as embodied in claim 6, wherein said arm and said means on said carrier have surfaces so disposed as to move said arm to the first mentioned position upon elevation of said carrier from said receptacle.

8. In an automatic photographic apparatus as embodied in claim 5, wherein a stop member is pivoted on the carrier to engage the lower end of said strip for retaining the latter within the carrier; and a second member in said receptacle for moving said strip member clear of said strip upon said carrier being moved into said receptacle.

9. In an automatic photographic apparatus for taking a series of pictures on a flexible sensitized strip, a carrier for receiving said strip after exposure, said carrier having open sides to expose the sides of said strip; a receptacle directly beneath said carrier; means for lowering said carrier into said receptacle and elevating the carrier from said receptacle; strip-wiping means in said receptacle normally inactive to wipe the sides of said strip; coacting means on said carrier and in said receptacle for rendering said strip-wiping means active to wipe said strip with elevation of said carrier from said receptacle; and means on said carrier for retaining said strip within the receptacle as the latter is elevated.

10. In an automatic photographic apparatus for taking a series a pictures on a flexible sensitized strip, a carrier for receiving said strip after exposure, said carrier having open sides to expose the sides of said strip; a receptacle directly beneath said carrier; means for lowering said carrier into said receptacle and elevating the carrier from said receptacle; strip-wiping means in said receptacle normally inactive to wipe the sides of said strip; coacting means on said carrier and in said receptacle for rendering said strip-wiping means active to wipe said strip with elevation of said carrier from said receptacle; and coacting members on said carrier and on said strip-wiping means operable by elevation of said carrier to move said strip-wiping means to inactive position.

11. In an automatic photographic apparatus for taking a series of pictures in sequence on a flexible sensitized strip; a carrier for receiving said strip after exposure; a turn-table beneath said carrier having thereon vessels and a delivery receptacle having a bottom opening therein; means for rotating said turntable step-by-step to successively present the vessels and then the receptacle in vertical alinement with said carrier; means for reciprocating said carrier in timed relation to the step-by-step rotation of said turntable, so that as said vessels and receptacles are vertically alined with said carrier, the latter will be lowered thereinto and then withdrawn therefrom; and mechanism in said receptacle for ejecting said strip from said carrier downwardly through said opening.

12. In an automatic photographic apparatus; for taking a series of pictures in sequence on a flexible sensitized strip; a carrier for receiving said strip after exposure; a turn-table beneath said carrier having thereon vessels adapted to contain solutions necessary to development and fixing of the pictures, and three receptacles; a strip-wiping device in the first of said receptacles; a strip-drying device in the second of said receptacles; a strip-ejecting device in the third of said receptacles; means for rotating said turntable step-by-step to successively and individually present said vessels and then said receptacles in vertical alinement with said carrier; and mechanism for vertically reciprocating said carrier in timed relation to the step-by-step rotation of said turntable, so that as said vessels and then said receptacles are vertically alined with said carrier, the latter will be lowered into each vessel and each receptacle and then withdrawn therefrom, whereby said strip will be treated to develop and fix the pictures thereon, then wiped, then dried, and finally ejected from the carrier into said third receptacle.

PHILIP S. ALLEN.